United States Patent
Otani et al.

(10) Patent No.: US 8,203,378 B2
(45) Date of Patent: Jun. 19, 2012

(54) BOOSTING CIRCUIT

(75) Inventors: Ayaka Otani, Chiba (JP); Tomohiro Oka, Chiba (JP)

(73) Assignee: Seiko Instruments Inc. (JP)

( * ) Notice: Subject to any disclaimer, the term of this patent is extended or adjusted under 35 U.S.C. 154(b) by 228 days.

(21) Appl. No.: 12/706,992

(22) Filed: Feb. 17, 2010

(65) Prior Publication Data

US 2010/0214011 A1    Aug. 26, 2010

(30) Foreign Application Priority Data

Feb. 20, 2009   (JP) ................................ 2009-038149

(51) Int. Cl.
*G05F 1/10*   (2006.01)

(52) U.S. Cl. ........................................ 327/537

(58) Field of Classification Search .................. 327/536, 327/537, 589
See application file for complete search history.

(56) References Cited

U.S. PATENT DOCUMENTS

| | | | |
|---|---|---|---|
| 6,052,022 A * | 4/2000 | Lee ................................ | 327/589 |
| 7,148,740 B2 * | 12/2006 | Kobayashi et al. ........... | 327/536 |
| 7,312,649 B2 * | 12/2007 | Origasa et al. ................ | 327/536 |
| 7,315,194 B2 * | 1/2008 | Shiga et al. .................... | 327/535 |
| 7,777,557 B2 * | 8/2010 | Yamahira ....................... | 327/536 |

FOREIGN PATENT DOCUMENTS

JP   2005-293697 A   10/2005

* cited by examiner

*Primary Examiner* — Hai L Nguyen

(74) *Attorney, Agent, or Firm* — Brinks Hofer Gilson & Lione

(57) ABSTRACT

Provided is a boosting circuit which avoids a malfunction of a peripheral circuit to be connected to the boosting circuit. The boosting circuit includes: a first discharge circuit for discharging a voltage of a first output terminal when a boosting unit stops a boosting operation; and a second discharge circuit for discharging a voltage of a second output terminal. The second discharge circuit discharges the voltage of the second output terminal to a potential of the first output terminal when a difference voltage between the voltage of the second output terminal and the voltage of the first output terminal is equal to or lower than a predetermined voltage.

7 Claims, 3 Drawing Sheets

BOOSTING CIRCUIT

RELATED APPLICATIONS

This application claims priority under 35 U.S.C. §119 to Japanese Patent Application No. 2009-038149 filed on Feb. 20, 2009, the entire content of which is hereby incorporated by reference.

BACKGROUND OF THE INVENTION

1. Technical Field

The present invention relates to a boosting circuit for outputting two kinds of boosted voltages of different voltage values, and more specifically, to a boosting circuit which includes discharge circuits for discharging boosted voltages when a boosting operation stops.

2. Description of the Related Art

In a semiconductor device, there may be employed a boosting circuit for outputting a boosted voltage higher than a power supply voltage from a boost terminal. For example, in a non-volatile semiconductor memory device, the boosted voltage is used at the time of writing/erasing into/from a memory cell transistor. In this case, two kinds of boosted voltages are used, and hence two boosting circuits are installed as illustrated in FIG. 3.

In a boosting circuit 80, a boosting unit 81 boosts a power supply voltage VDD and outputs a first boosted voltage VPPL to a peripheral circuit (not shown). When the boosting operation stops, a discharge circuit 82 is turned ON so that the first boosted voltage VPPL may be discharged to the power supply voltage VDD. On the other hand, in a boosting circuit 90, a boosting unit 91 boosts the power supply voltage VDD and outputs a second boosted voltage VPPH higher than the first boosted voltage VPPL to the peripheral circuit. When the boosting operation stops, a discharge circuit 92 is turned ON so that the second boosted voltage VPPH may be discharged to the power supply voltage VDD (see, for example, JP 2005-293697 A).

In the conventional technology, the boosted voltages are discharged by the discharge circuits, respectively, and hence a state where the second boosted voltage VPPH is equal to or higher than the first boosted voltage VPPL cannot always be secured. In other words, there is a fear that the first boosted voltage VPPL may become higher than the second boosted voltage VPPH as a result of the individual discharges of the boosted voltages. Here, the peripheral circuit connected to both the boosting circuits is assumed to employ, for example, a PMOS transistor (not shown) having a drain applied with the first boosted voltage VPPL and a source and a back gate which are applied with the second boosted voltage VPPH. In this case, in the above-mentioned PMOS transistor, a drain voltage is higher than a source voltage and a back gate voltage, and accordingly a current flows through a parasitic diode connected between the drain and the back gate of the PMOS transistor. As a result, there is a fear that a CMOS transistor circuit associated with the above-mentioned PMOS transistor may be latched up, resulting in a problem that a malfunction occurs in the peripheral circuit.

SUMMARY OF THE INVENTION

The present invention has been made in view of the above-mentioned problem, and provides a boosting circuit which is capable of avoiding a malfunction of a peripheral circuit to be connected to the boosting circuit.

In order to solve the above-mentioned problem, the present invention provides a boosting circuit including: a first discharge circuit for discharging a voltage of a first output terminal when a boosting unit stops a boosting operation; and a second discharge circuit for discharging a voltage of a second output terminal, in which the second discharge circuit discharges the voltage of the second output terminal to a potential of the first output terminal when a difference voltage between the voltage of the second output terminal and the voltage of the first output terminal is equal to or lower than a predetermined voltage.

According to the present invention, during the stop of the boosting operation, when the difference voltage between the voltage of the second output terminal and the voltage of the first output terminal becomes equal to or lower than the predetermined voltage, the voltage of the second output terminal is discharged to the potential of the first output terminal, and hence the voltage of the first output terminal is prevented from exceeding the voltage of the second output terminal. Therefore, a malfunction of a peripheral circuit may be avoided.

DETAILED DESCRIPTION OF THE PREFERRED EMBODIMENTS

Now, referring to the accompanying drawings, an embodiment of the present invention is described below.

Figure 1:
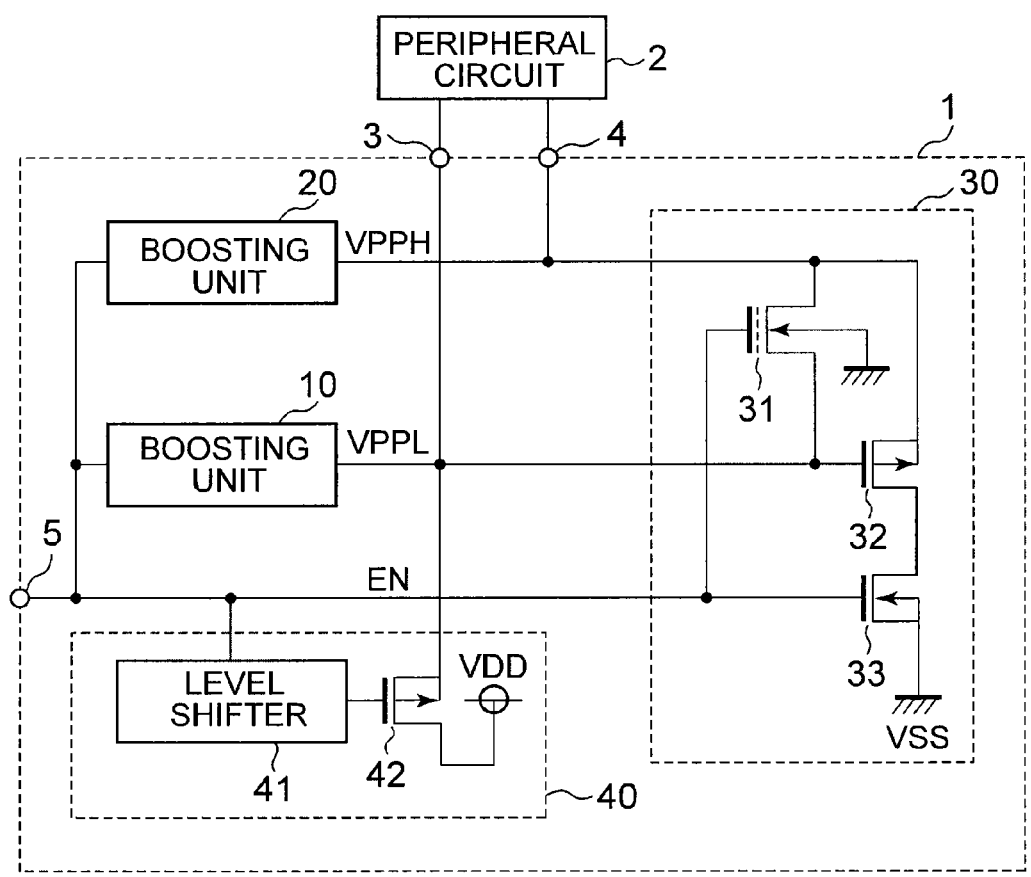
FIG. 1 is a circuit diagram illustrating a boosting circuit including discharge circuits according to the present invention.

First, a configuration of a boosting circuit according to the embodiment of the present invention is described. FIG. 1 is a circuit diagram illustrating a boosting circuit 1 including discharge circuits according to the present invention.

The boosting circuit 1 includes a boosting unit 10, a boosting unit 20, a discharge circuit 30, and a discharge circuit 40. The discharge circuit 30 includes a depletion type NMOS transistor 31, an enhancement type PMOS transistor 32, and an enhancement type NMOS transistor 33. The discharge circuit 40 includes a level shifter 41 and an enhancement type PMOS transistor 42.

A first output terminal 3 of the boosting circuit 1 is connected to a boosted voltage output terminal of the boosting unit 10 to output a first boosted voltage VPPL to a peripheral circuit 2. A second output terminal 4 of the boosting circuit 1 is connected to a boosted voltage output terminal of the boosting unit 20 to output a second boosted voltage VPPH to the peripheral circuit 2. An enable terminal 5 serving as a control terminal of the boosting circuit 1 is connected to each of enable terminals of the boosting unit 10, the boosting unit 20, the discharge circuit 30, and the discharge circuit 40.

In the discharge circuit 30, the NMOS transistor 31 has a gate connected to the enable terminal 5, a source connected to the first output terminal 3, a drain connected to the second output terminal 4, and a back gate connected to a ground terminal. The PMOS transistor 32 has a gate connected to the first output terminal 3, a source and a back gate which are connected to the second output terminal 4, and a drain connected to a drain of the NMOS transistor 33. The NMOS transistor 33 has a gate connected to the enable terminal 5, and a source and a back gate which are connected to the ground terminal.

In the discharge circuit 40, an input terminal of the level shifter 41 is connected to the enable terminal 5, and an output terminal thereof is connected to a gate of the PMOS transistor 42. The PMOS transistor 42 has a source and a back gate which are connected to the first output terminal 3, and a drain connected to a power supply terminal.

The boosting unit 10 outputs the first boosted voltage VPPL. The boosting unit 20 outputs the second boosted voltage VPPH. The discharge circuit 40 discharges the first boosted voltage VPPL of the first output terminal 3. The discharge circuit 30 discharges the second boosted voltage VPPH of the second output terminal 4.

The NMOS transistor 31 has a threshold voltage (−Vtnd). The PMOS transistor 32 and the PMOS transistor 42 each have a threshold voltage (−Vtp). The NMOS transistor 33 has a threshold voltage Vtn.

When a boosting operation stops, the PMOS transistor 42 is turned ON so that a discharge path for discharging the first boosted voltage VPPL may be brought into conduction. In order that the PMOS transistor 42 may operate as described above, the level shifter 41 converts and outputs an enable terminal voltage EN.

When the boosting operation stops, the NMOS transistor 33 is turned ON so that a discharge path for discharging the second boosted voltage VPPH to a ground voltage VSS may be brought into conduction. When the first boosted voltage VPPL is discharged by the other circuit to a predetermined voltage or lower, the NMOS transistor 31 is turned ON. In the state where the NMOS transistor 31 is turned ON, when the second boosted voltage VPPH becomes equal to or lower than a total voltage (VPPL+Vtp) of the first boosted voltage VPPL and an absolute value Vtp of the threshold voltage of the PMOS transistor 32, the PMOS transistor 32 is turned OFF so that the discharge path may be brought into non-conduction.

Figure 2:
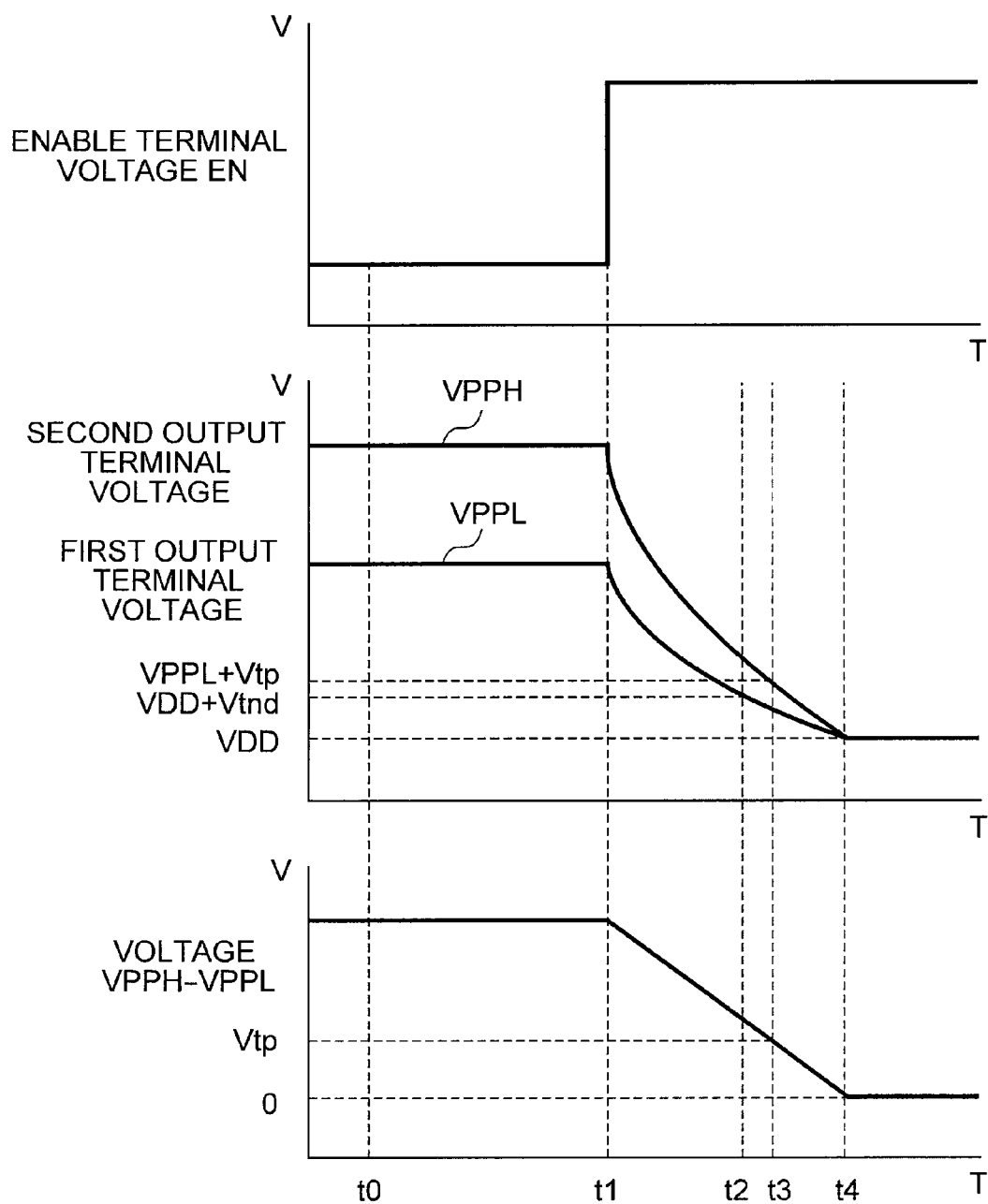
FIG. 2 is a time chart for describing operations of the boosting circuit including the discharge circuits according to the present invention.
Figure 3:
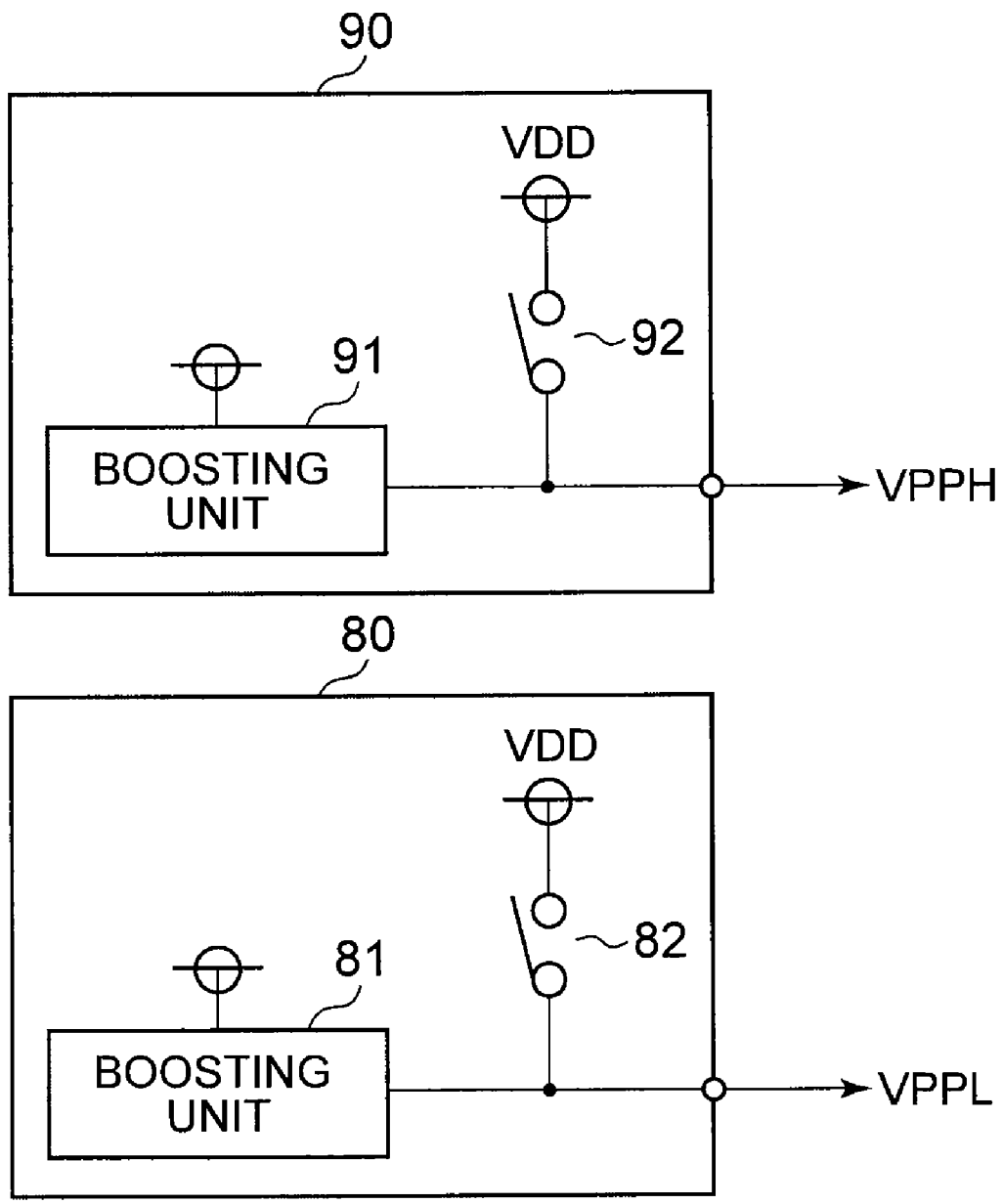
FIG. 3 is a circuit diagram illustrating conventional boosting circuits including discharge circuits.

Next, operations of the boosting circuit 1 are described. FIG. 2 is a time chart for illustrating the operations of the boosting circuit 1.

During a period of t0≦t<t1 when the boosting circuit 1 performs the boosting operation, the enable terminal voltage EN is controlled to be Low.

The boosting unit 10 and the boosting unit 20 each perform the boosting operation such that the boosting unit 10 boosts a power supply voltage VDD to output the first boosted voltage VPPL while the boosting unit 20 boosts the power supply voltage VDD to output the second boosted voltage VPPH higher than the first boosted voltage VPPL. During this period, the first boosted voltage VPPL and the second boosted voltage VPPH are each controlled to have a desired voltage value. The output voltage of the level shifter 41 is High obtained by the level-shift from the power supply voltage VDD to the first boosted voltage VPPL. Accordingly, the PMOS transistor 42 is turned OFF.

Because the enable terminal voltage EN is controlled to be Low, the NMOS transistor 31 and the NMOS transistor 33 are also turned OFF. Further, a voltage (VPPH−VPPL) is equal to or higher than the absolute value Vtp of the threshold voltage of the PMOS transistor 32. Accordingly, the PMOS transistor 32 is turned ON.

At a time t=t1, the enable terminal voltage EN is controlled to be High.

The boosting unit 10 and the boosting unit 20 each stop the boosting operation. The output voltage of the level shifter 41 becomes Low, and then the PMOS transistor 42 is turned ON so that the boosted voltage output terminal of the boosting unit 10 may be connected to the power supply terminal. The boosted voltage output terminal of the boosting unit 10 starts to be discharged, and the first boosted voltage VPPL starts to decrease. Further, because the enable terminal voltage EN is controlled to be High, the NMOS transistor 33 is also turned ON. At this time, as described above, the NMOS transistor 31 remains turned OFF, whereas the PMOS transistor 32 remains turned ON. Therefore, the boosted voltage output terminal of the boosting unit 20 is connected to the ground terminal. Then, the boosted voltage output terminal of the boosting unit 20 starts to be discharged, and the second boosted voltage VPPH starts to decrease. At this time, the voltage (VPPH−VPPL) also starts to decrease. The discharge path of the second boosted voltage VPPH on this occasion is a path extending from the boosted voltage output terminal of the boosting unit 20 to the ground terminal via the PMOS transistor 32 and the NMOS transistor 33 provided therebetween.

At a time t=t2, the first boosted voltage VPPL decreases to a voltage (VDD+Vtnd) or lower. Then, a gate-source voltage of the NMOS transistor 31 becomes equal to or higher than its threshold voltage (−Vtnd), and accordingly the NMOS transistor 31 is turned ON. The discharge path of the second boosted voltage VPPH on this occasion is both of the path extending from the boosted voltage output terminal of the boosting unit 20 to the ground terminal via the PMOS transistor 32 and the NMOS transistor 33 provided therebetween, and a path extending from the boosted voltage output terminal of the boosting unit 20 to the power supply terminal via the NMOS transistor 31 and the PMOS transistor 42 provided therebetween.

At a time t=t3, the second boosted voltage VPPH decreases to the voltage (VPPL+Vtp) or lower. In other words, the voltage (VPPH−VPPL) becomes equal to or lower than the absolute value Vtp of the threshold voltage of the PMOS transistor 32. Accordingly, the PMOS transistor 32 is turned OFF. The discharge path of the second boosted voltage VPPH on this occasion is the path extending from the boosted voltage output terminal of the boosting unit 20 to the power supply terminal via the NMOS transistor 31 and the PMOS transistor 42 provided therebetween.

At a time t=t4, both of the first boosted voltage VPPL and the second boosted voltage VPPH decrease to the power supply voltage VDD. Therefore, the voltage (VPPH−VPPL) becomes 0 V.

As described above, the path for the discharge to the ground voltage VSS via the PMOS transistor 32 and the path for the discharge to the power supply voltage VDD via the NMOS transistor 31 are prepared for the second boosted voltage VPPH. When the second boosted voltage VPPH becomes lower than the voltage (VPPL+Vtp), the PMOS transistor 32 is turned OFF, and hence the path for the discharge to the ground voltage VSS via the PMOS transistor 32 is brought into non-conduction. On the other hand, when the first boosted voltage VPPL decreases to the voltage (VDD+Vtnd) or lower, the path for the discharge to the power supply voltage VDD via the NMOS transistor 31 is brought into conduction, and hence the second boosted voltage VPPH is connected to the power supply terminal via the first boosted voltage VPPL. Therefore, the state where the second boosted voltage VPPH is equal to or higher than the first boosted voltage VPPL may always be secured. As a result, in a PMOS transistor (not shown) having a drain applied with the first boosted voltage VPPL and a source and a back gate which are applied with the second boosted voltage VPPH, a drain voltage is always controlled to be equal to or lower than a source voltage and a back gate voltage, and hence no current flows through a parasitic diode connected between the drain and the back gate of the PMOS transistor. As a result, no malfunction occurs in the peripheral circuit including this PMOS transistor.

Note that in FIG. 1, two boosting units are provided as the circuits for outputting the two kinds of boosted voltages, but a single boosting unit may be provided. In this case, as the single boosting unit, for example, a charge pump circuit including booster cells connected in four stages is used, and the first boosted voltage VPPL corresponds to an output voltage of the second-stage booster cell while the second boosted voltage VPPH corresponds to an output voltage of the fourth-stage booster cell.

Further, by adjusting the threshold voltage of the NMOS transistor 31, the timing at which the NMOS transistor 31 is turned ON during the stop of the boosting operation may be adjusted.

Further, by adjusting the threshold voltage of the PMOS transistor 32, the timing at which the PMOS transistor 32 is turned OFF during the stop of the boosting operation may be adjusted.

What is claimed is:

1. A boosting circuit for boosting and outputting an input power supply voltage, comprising:
    a boosting unit for outputting a first boosted voltage and a second boosted voltage higher than the first boosted voltage;
    a first output terminal for outputting the first boosted voltage;
    a second output terminal for outputting the second boosted voltage;
    a first discharge circuit for discharging a voltage of the first output terminal after the boosting unit has stopped a boosting operation; and
    a second discharge circuit for discharging a voltage of the second output terminal after the boosting unit has stopped the boosting operation,
    wherein the second discharge circuit discharges the voltage of the second output terminal to a potential of the first output terminal when a difference voltage between the voltage of the second output terminal and the voltage of the first output terminal is equal to or lower than a predetermined voltage.

2. A boosting circuit for boosting and outputting an input power supply voltage, comprising:
    a boosting unit for outputting a first boosted voltage and a second boosted voltage higher than the first boosted voltage;
    a first output terminal for outputting the first boosted voltage;
    a second output terminal for outputting the second boosted voltage;
    a first discharge circuit for discharging a voltage of the first output terminal after the boosting unit has stopped a boosting operation; and
    a second discharge circuit for discharging a voltage of the second output terminal after the boosting unit has stopped the boosting operation,
    wherein the second discharge circuit discharges the voltage of the second output terminal to a potential of the first output terminal when a difference voltage between the voltage of the second output terminal and the voltage of the first output terminal is equal to or lower than a predetermined voltage;
    a control terminal for inputting a control signal;
    wherein the second discharge circuit comprises:
    a first transistor including a source connected to the first output terminal, a drain connected to the second output terminal, and a gate connected to the control terminal;
    a second transistor including a source connected to the second output terminal, and a gate connected to the first output terminal; and
    a third transistor including a source connected to a predetermined potential, a drain connected to a drain of the second transistor, and a gate connected to the control terminal, and
    wherein the predetermined voltage comprises an absolute value of a threshold voltage of the second transistor.

3. The boosting circuit according to claim 2, wherein the predetermined potential comprises a power supply voltage.

4. The boosting circuit according to claim 2, wherein the predetermined potential comprises a ground potential.

5. The boosting circuit according to claim 2, wherein the first transistor comprises a depletion type MOS transistor.

6. The boosting circuit according to claim 5, wherein the predetermined potential comprises a ground potential.

7. The boosting circuit according to claim 5, wherein the predetermined potential comprises a power supply voltage.

* * * * *